(12) United States Patent
Casselman (10) Patent No.: US 9,043,739 B1
(45) Date of Patent: May 26, 2015

(54) PLACEMENT BASED ARITHMETIC OPERATOR SELECTION

(71) Applicant: Altera Corporation, San Jose, CA (US)

(72) Inventor: Steve Casselman, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/278,675

(22) Filed: May 15, 2014

(51) Int. Cl.
  *G06F 17/50* (2006.01)
  *G06F 9/30* (2006.01)

(52) U.S. Cl.
  CPC .................................... *G06F 9/3001* (2013.01)

(58) Field of Classification Search
  CPC ............ G06F 17/5054; G06F 17/5045; G06F 17/5031; G06F 17/5022; G06F 17/5027; G06F 2217/84; G06F 2217/86; G06F 11/261; G06F 17/5063; G06F 2217/08; H03K 19/17748
  USPC .......... 716/116, 117, 111, 113, 108, 106, 103
  See application file for complete search history.

(56) References Cited

U.S. PATENT DOCUMENTS

| 5,666,296 | A  | * | 9/1997 | Gafter ........................... 716/103 |
| 6,708,139 | B2 | * | 3/2004 | Rearick et al. ................ 702/185 |
| 7,565,631 | B1 | * | 7/2009 | Banerjee et al. .............. 716/103 |
| 8,504,970 | B1 | * | 8/2013 | Malhotra et al. .............. 716/134 |
| 8,769,450 | B1 | * | 7/2014 | Tian et al. ..................... 716/103 |

* cited by examiner

*Primary Examiner* — Brian Ngo
(74) *Attorney, Agent, or Firm* — Ropes & Gray LLP (57) ABSTRACT

Methods and systems are described for placing arithmetic operators on a programmable integrated circuit device (e.g., a PLD). Placement of arithmetic operators of a data flow graph in one of multiple regions (e.g., a region of DSP circuitry blocks or a region of logic fabric circuitry) on the programmable integrated circuitry device may be determined (e.g., randomly). A score related to the performance of the graph (e.g., a score related to data flow graph routing delays or area consumed by the data flow graph) may be determined and this process may be repeated after one of the arithmetic operators of the data flow graph is moved. The placement of arithmetic operators that corresponds to the best value for the score related to the performance of the data flow graph may be stored. Accordingly, more arithmetic operators may be included on a programmable integrated device than in conventional devices.

16 Claims, 5 Drawing Sheets

400⤹

410⤹
Determine Arithmetic Operator Placement, in the Regions of a Programmable Integrated Circuit Device, for a Data Flow Graph 420⤹
Determine a Score for the Data Flow Graph Resulting from the Placement of Arithmetic Operators and Store the Score and Data Flow Graph for a Data Flow Graph that has a Score Beyond a Threshold or the Lowest or the Highest Score 430⤹
Move One or More Arithmetic Operators Between Regions for the Data Flow Graph

PLACEMENT BASED ARITHMETIC OPERATOR SELECTION

FIELD OF THE INVENTION

This invention relates to the use the compiler of a high-level language to configure programmable integrated circuit devices such as a field-programmable gate array (FPGAs) or other type of programmable logic devices (PLDs).

BACKGROUND OF THE INVENTION

A programmable logic device (PLD) may be one example of an integrated circuit device. Programmable logic devices generally provide the user with the ability to configure the devices for look-up-table-type logic operations.

Early programmable logic devices were provided with embedded blocks of random access memory that could be configured by the user to act as random access memory, read-only memory, or logic (such as P TERM logic). As applications for which PLDs are used have increased in complexity, and as these devices have become larger, it has become more common to design PLDs to also include configurable specialized processing blocks, such as digital signal processing (DSP) blocks, in addition to blocks of generic programmable logic resources. It has also become more common to add dedicated circuits on the programmable devices for various commonly-used functions. Such dedicated circuits could include phase-locked loops or delay-locked loops for clock generation, as well as various circuits for various mathematical operations such as addition or multiplication.

Such programmable logic devices were configured using programming software that was provided to allow a user to lay out logic as desired and then translate that logic into a configuration for the programmable device. Such software also now commonly includes pre-defined functions, commonly referred to as "cores," for configuring certain commonly-used structures, and particularly for configuring circuits for mathematical operations incorporating the aforementioned dedicated circuits. For example, cores may be provided for various trigonometric or algebraic functions.

Although available programming software may allow programming a device using a hardware description language, some programming software may allow for programming using a high-level programming language (HLL). One HLL that may be adopted for configuring a programmable device is OpenCL (Open Computing Language), although use of other high-level languages, and particularly other high-level synthesis languages, including C, C++, Fortran, C#, F#, BlueSpec and Matlab, also is within the scope of this invention. In OpenCL, for example, computation is performed using a combination of a host and kernels, where the host is responsible for input/output (I/O) and setup tasks, and kernels perform computation on independent inputs.

In any HLL, such as OpenCL, the kernel compiler may convert a kernel into a hardware circuit that implement an application from an OpenCL description. The compiler may parse, analyze, optimize, and implement a kernel as a high-performance pipelined circuit, suitable for implantation on a programmable device, such as an FPGA. The HLL compiler may generate a hardware-oriented data structure, such as a data flow graph. This data structure may represent a basic block module of circuitry on the programmable logic device. This data structure may also represent the kernel at a low level, and may contain information about its area and maximum clock frequency. The data flow graph can then be optimized to improve area and performance of the system, prior to RTL generation which may produce a Verilog HDL description of each kernel. In this process the HLL complier may use, e.g., existing Verilog or VHDL to implement primitive arithmetic operator units, including multiplication, division, addition, and subtraction or more complex functions like sine, cosine, or tangent.

DSP blocks may be spread across a programmable integrated circuit device, and the OpenCL compiler may be limited with respect to where arithmetic operator units may be placed on the device. For example, this may occur if, using the HLL compiler, the arithmetic operator units may only be placed within DSP blocks, or if the units may only be placed in logic fabric surrounding the DSP blocks on the programmable integrated circuit device. As used herein, an arithmetic operator may be any arithmetic operator unit such as a multiplier or an adder. In particular, most HLL to HDL compilers use only one of two kinds of arithmetic operators on the programmable integrated circuit device, either a arithmetic operator entirely based in logic fabric of a PLD or a arithmetic operator entirely based in DSP blocks of the PLD. Low level synthesis tools may not make use of both kinds of arithmetic operators because each kind of arithmetic operator may have different routing delays making it more difficult to get correct behavior from the set of arithmetic operators once the design has been simulated with generic HDL code.

SUMMARY OF THE INVENTION

For a more efficient use of the PLD, an HLL compiler may use both kinds of arithmetic operators, i.e., arithmetic operators based in the DSP blocks and arithmetic operators based in the logic fabric of the programmable integrated circuit device. HLL compilers, such as the OpenCL compiler, may be able to determine a way to generate a data flow graph using both kinds of arithmetic operators, while compensating for the different routing delays of the arithmetic operators.

For example, PLDs sold by Altera Corporation, of San Jose, Calif., as part of the STRATIX® and ARRIA® families may include DSP blocks and logic fabric. Arithmetic operators, such as floating point multipliers and adders, may be implemented in such PLDs in either the logic fabric or DSP blocks. In addition, these PLDs may include a plurality of multipliers implemented either in the DSP blocks, the logic fabric, or both, as well as adders, and registers, and programmable connectors (e.g., multiplexers) that allow the various components of PLDs to be configured in different ways.

Methods and systems are described herein for placing arithmetic operators on a programmable integrated circuit device (e.g., a PLD). As used herein, an arithmetic operator may be any arithmetic operator unit such as a multiplier or an adder. Placement of arithmetic operators of a data flow graph in one of multiple regions (e.g., a region of DSP blocks or a region of logic fabric) on the programmable integrated circuitry device may be determined (e.g., randomly). A score related to the performance of the data flow graph (e.g., a score related to data flow graph routing delays or area consumed by the data flow graph) may be determined. In some embodiments, one of the arithmetic operators of the data flow graph may be moved and the score related to the performance of the data flow graph (e.g., a score related to data flow graph routing delays or area consumed by the data flow graph) may again be determined. The placement of arithmetic operators of the data flow graph that corresponds to the best value for the score related to the performance of the data flow graph (e.g., a score related to data flow graph routing delays or area consumed by the data flow graph) may be stored. In this way, the best placement of arithmetic operators of a data flow graph on a programmable integrated circuit device may be determined.

Methods and systems are described herein that include a programmable integrated circuit device (e.g., a PLD) that may be configured using a high-level language (such as, OpenCL). The programmable integrated circuit device may include arithmetic operators associated with a data flow graph. The placement of arithmetic operators, of the associated data flow graph, may be in one of multiple regions of the programmable integrated circuit device. In some embodiments, the multiple regions may include a region of DSP circuitry blocks and/or a region of logic fabric.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

As discussed above, in a HLL such as OpenCL, an application is executed in two parts a host and a kernel. The host is a program responsible for processing I/O requests and a kernel represents a unit of computation to be performed. A programmable integrated circuit device such as a PLD may be programmed using a high-level language such as OpenCL based on a set of kernels and a host program. The kernels may be compiled into hardware circuit representations using a compiler that may be extended for this purpose.

An optimized compiler intermediate representation may then converted into a hardware-oriented data structure, such as a data flow graph. This data structure may represent a basic block module of circuitry on the programmable device. This data structure may also represent the kernel at a low level. Operations inside the basic block module, represented by a data flow graph, may be scheduled. Each node in the data flow graph may be allocated a set of registers and clock cycles that it may require to complete an operation. The data flow graph may then be optimized to improve area and performance of the system, prior to RTL generation, which produces a Verilog HDL description of each kernel. The compiled kernels may then instantiated in a system that preferably contains an interface to the host as well as a memory interface.

Figure 1:
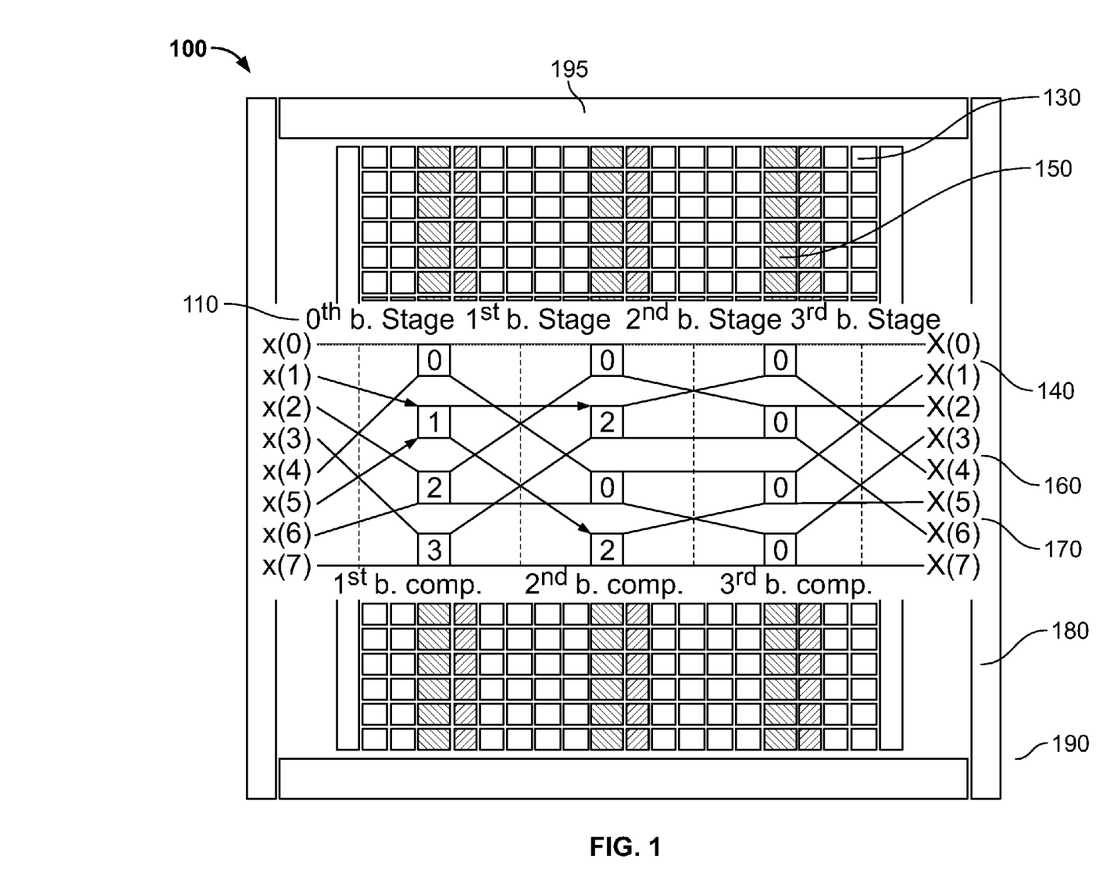
FIG. 1 shows a floor plan of a PLD, as one example of a programmable integrated circuit device, on which a data flow graph of a basic block module of multiply accumulate units (MACS), that make use of arithmetic operators based entirely in DSP blocks, is implemented according to some embodiments.

FIG. 1 shows a floor plan of PLD 100, as one example of a programmable integrated circuit device, on which data flow graph of a basic block module of MACs 110, that make use of arithmetic operators based entirely in DSP blocks, is implemented in accordance with some embodiments. Device 100 includes regions of core logic fabric 130, which may include programmable logic elements, regions of variable precision specialized processing blocks 150, which may include DSP blocks, regions of internal memory blocks 140, regions of fractional phase locked loops (PLLs) 160, regions of embedded hard logic circuitry 170 (such as Altera's HARDCOPY® blocks that may include PCI Express, Gen 1, Gen 2, or Gen 3), regions of hard transceiver circuitry 180 (such as, e.g., hard IP blocks including 3G/6G PCS, 10G Ethernet PCS, or Interlaken PCS circuitry), regions of high speed serial transceivers 190, and regions of general purpose input/output circuitry 195.

Core logic fabric 130 may include programmable logic elements, which may be any combination of logic gates and memory. In certain embodiments, these programmable logic elements may be grouped into logic array blocks ("LABs"), referring to a unit of programmable logic resources in devices provided by Altera Corporation, of San Jose, Calif. However, the invention is applicable to programmable logic elements from any source. In certain embodiments, the programmable logic elements may be grouped into hardware blocks. Each hardware block may be designated to perform a certain type of hardware event on received data. In certain embodiments, the hardware blocks may be configurable such that the event is tailored to that particular situation. For example, the hardware blocks may accept parameters that further define the hardware event to be performed on a received data packet. Parameters may be transmitted to the hardware acceleration blocks through a data bus (not shown) that includes horizontal and vertical connectors that are connected to various components on device 100.

Internal memory blocks 140 may be placed near or adjacent to core logic fabric 130, and may include accessible memory for circuitry associated with core logic fabric 130 or specialized processing blocks 150. In some embodiments, programmable logic elements on core logic fabric 130 may make use of memory blocks 140. In some embodiments, memory blocks 140 may be M20K internal memory blocks.

Variable precision specialized processing blocks 150 may include digital signal processing (DSP) blocks, in addition to blocks of generic programmable logic resources. Such variable precision specialized processing blocks may include a concentration of circuitry that has been partly or fully hardwired to perform one or more specific tasks, such as a logical or a mathematical operation. A variable precision specialized processing block may also contain one or more specialized structures, such as an array of configurable memory elements. Variable precision specialized processing blocks 150 may be able to process data that may be of any precision.

Fractional PLLs 160 may include circuitry for providing clock signals to any circuitry internal or external device 100. As such, fractional PLLs 160 may include connections to any other region within device 100.

Embedded hard logic circuitry 170 may include hard-IP blocks, such as Altera's HARDCOPY® blocks, used for input/output functions. For example, embedded hard logic circuitry 170 may be used to implement embedded industrial protocols. In particular, embedded hard logic circuitry 170 may be used to implement the PCI Express, Gen 1, Gen 2, or Gen 3 protocols.

Hard transceiver circuitry 180 may include hard-IP transceiver blocks that may implement physical layer protocols, such as physical coding sublayer (PCS) protocols. For example, these hard-IP transceiver blocks could include 3G/6G PCS, 10G Ethernet PCS, and/or Interlaken PCS.

High-speed serial transceivers 190 may facilitate the transfer of information between sources of data (not shown) external to device 100 and circuitry on device 100. For example, high-speed serial transceivers 190 may interface with an Ethernet connection to receive packets of information, process these packets with circuitry on device 100, and switch the packets to different physical interfaces. General purpose input/output circuitry 195 may be configured to input or output data, can read or write data, can be used as IRQs for wakeup events, or can be used to transfer data from sources peripheral to device 100. In certain embodiments, high-speed serial transceivers 190 may transfer data at much higher speeds than general purpose input/output circuitry 195. For example, high-speed serial transceivers 190 may read and write data at a rate of tens of Gigabits per second, while general purpose input/output circuitry 195 may write data at a rate hundreds of Megabits. In certain embodiments, high speed serial interface 190 may operate at line rate, meaning the aggregate throughput rate of device 100 (e.g., 100 Gigabits per second across multiple serial channels), while other circuitry on device 100 may operate at a distributed rate, meaning that the aggregate throughput of processing threads (and corresponding memories and specialized processing blocks used with those processing threads) is no worse than the minimum throughput for the target application of device 100.

Data flow graph of MACs 110 may include four stages of arithmetic operators (stages 0 through 3). Each of the arithmetic operators in data flow graph of MACs 110 uses arithmetic operators based entirely in DSP blocks. In particular, each of the arithmetic operators in data flow graph of MACs 110 is implemented in one of the regions of variable precision specialized processing blocks 150 (which may include DSP blocks). As shown in FIG. 1, data flow graph of MACs 110 may consume a large amount of the area of the floor plan of PLD 100 (e.g, a substantial area of device 100). In addition data flow graph of MACs 110 may have large routing delays for each of the paths of the graph.

Figure 2:
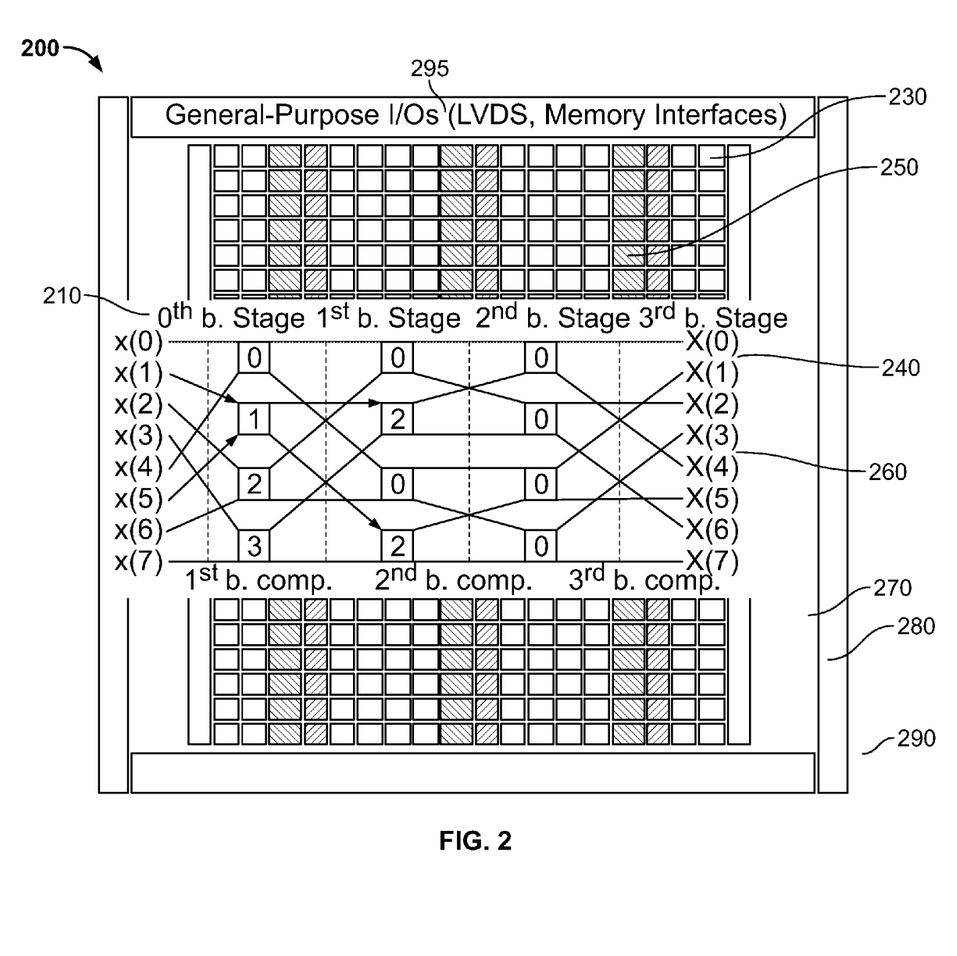
FIG. 2 shows a floor plan of a PLD, as one example of a programmable integrated circuit device, on which a data flow graph of a basic block module of MACS, which make use of arithmetic operators based entirely in logic fabric, is implemented according to some embodiments.

FIG. 2 shows a floor plan of PLD 200, as one example of a programmable integrated circuit device, on which data flow graph of a basic block module of MACs 210, which make use of arithmetic operators based entirely in logic fabric, is implemented in accordance with some embodiments. Device 200 includes regions of core logic fabric 230, which may include programmable logic elements, regions of variable precision specialized processing blocks 250, which may include DSP blocks, regions of internal memory blocks 240, regions of fractional PLLs 260, regions of embedded hard logic circuitry 270 (such as Altera's HARDCOPY® blocks that may include PCI Express, Gen 1, Gen 2, or Gen 3), regions of hard transceiver circuitry 280 (such as, e.g., hard IP blocks including 3G/6G PCS, 10G Ethernet PCS, or Interlaken PCS circuitry), regions of high speed serial transceivers 290, and regions of general purpose input/output circuitry 295.

Core logic fabric 230 may be similar in form and function to core logic fabric 130. Internal memory blocks 240 may be similar in form and function to internal memory blocks 140. Variable precision specialized processing blocks 250 may be similar in form and function to variable precision specialized processing blocks 150. Fractional PLLs 260 may be similar in form and function to fractional PLLs 160. Embedded hard logic circuitry 270 may be similar in form and function to embedded hard logic circuitry 170. Hard transceiver circuitry 280 may be similar in form and function to hard transceiver circuitry 180. High-speed serial transceivers 290 may be similar in form and function to high-speed serial transceivers 190. General purpose input/output circuitry 295 may be similar in form and function to general purpose input/output circuitry 195.

Data flow graph of MACs 210 may include four stages of arithmetic operators (stages 0 through 3). Each of the arithmetic operators in data flow graph of MACs 210 uses arithmetic operators based entirely in logic fabric. In particular, each of the arithmetic operators in data flow graph of MACs 210 is implemented in one of the regions of logic fabric 230. As shown in FIG. 2, similar to data flow graph of MACs 110, data flow graph of MACs 210 may consume a large amount of the area of the floor plan of PLD 200 (e.g, a substantial area of device 200). In addition data flow graph of MACs 210 may have large routing delays for each of the paths of the graph.

Figure 3:
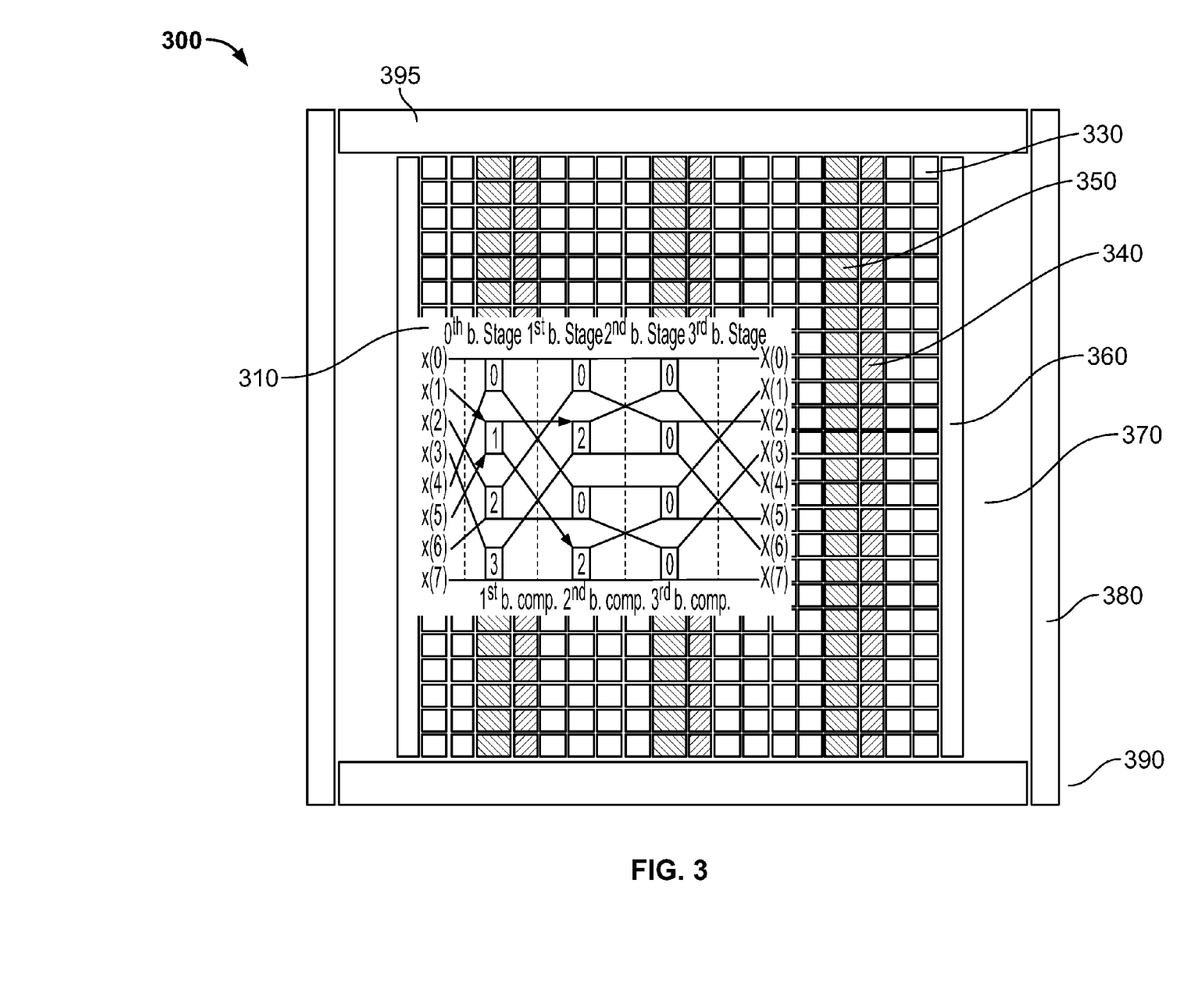
FIG. 3 shows a floor plan of a PLD, as one example of a programmable integrated circuit device, on which a data flow graph of a basic block module of MACS, which make use of arithmetic operators based both in DSP blocks and in logic fabric, is implemented according to some embodiments.

FIG. 3 shows a floor plan of PLD 300, as one example of a programmable integrated circuit device, on which data flow graph of a basic block module of MACs 310, which make use of arithmetic operators based both in DSP blocks and in logic fabric, is implemented in accordance with some embodiments. Device 300 includes regions of core logic fabric 330, which may include programmable logic elements, regions of variable precision specialized processing blocks 350, which may include DSP blocks, regions of internal memory blocks 340, regions of fractional PLLs 360, regions of embedded hard logic circuitry 370 (such as Altera's HARDCOPY® blocks that may include PCI Express, Gen 1, Gen 2, or Gen 3), regions of hard transceiver circuitry 380 (such as, e.g., hard IP blocks including 3G/6G PCS, 10G Ethernet PCS, or Interlaken PCS circuitry), regions of high speed serial transceivers 390, and regions of general purpose input/output circuitry 395.

Core logic fabric 330 may be similar in form and function to core logic fabric 130. Internal memory blocks 340 may be similar in form and function to internal memory blocks 140. Variable precision specialized processing blocks 350 may be similar in form and function to variable precision specialized processing blocks 150. Fractional PLLs 360 may be similar in form and function to fractional PLLs 160. Embedded hard logic circuitry 370 may be similar in form and function to embedded hard logic circuitry 170. Hard transceiver circuitry 380 may be similar in form and function to hard transceiver circuitry 180. High-speed serial transceivers 390 may be similar in form and function to high-speed serial transceivers 190. General purpose input/output circuitry 395 may be similar in form and function to general purpose input/output circuitry 195.

Data flow graph of MACs 310 may include four stages of arithmetic operators (stages 0 through 3). Each of the arithmetic operators in data flow graph of MACs 310 uses arithmetic operators that are based in either DSP blocks or in core logic fabric. In particular, each of the arithmetic operators in data flow graph of MACs 310 is implemented in one of the regions of variable precision specialized processing blocks 350 (which may include DSP blocks) or in one of the regions of core logic fabric 330. As shown in FIG. 3, data flow graph of MACs 310 may consume a smaller amount of the area of the floor plan of PLD 300, than the amount of area consumed by data flow graphs of MACs 110 or 210. Thus, because data flow graph of MACs 310 uses arithmetic operators that are based in either DSP blocks or in core logic fabric, it may more efficiently utilize the area of device 300. Thus, it may be possible to include more arithmetic operators on device 300 than using arithmetic operators based is only DSP blocks or only logic fabric. In addition data flow graph of MACs 310 may have smaller average routing delays for each of the paths of the graph when compared to the routing delays of similar paths in data flow graphs of MACs 110 or 210. Thus, because data flow graph of MACs 310 uses arithmetic operators that are based in either DSP blocks or in core logic fabric, data flow graph path routing delays may be reduced.

Figure 4:
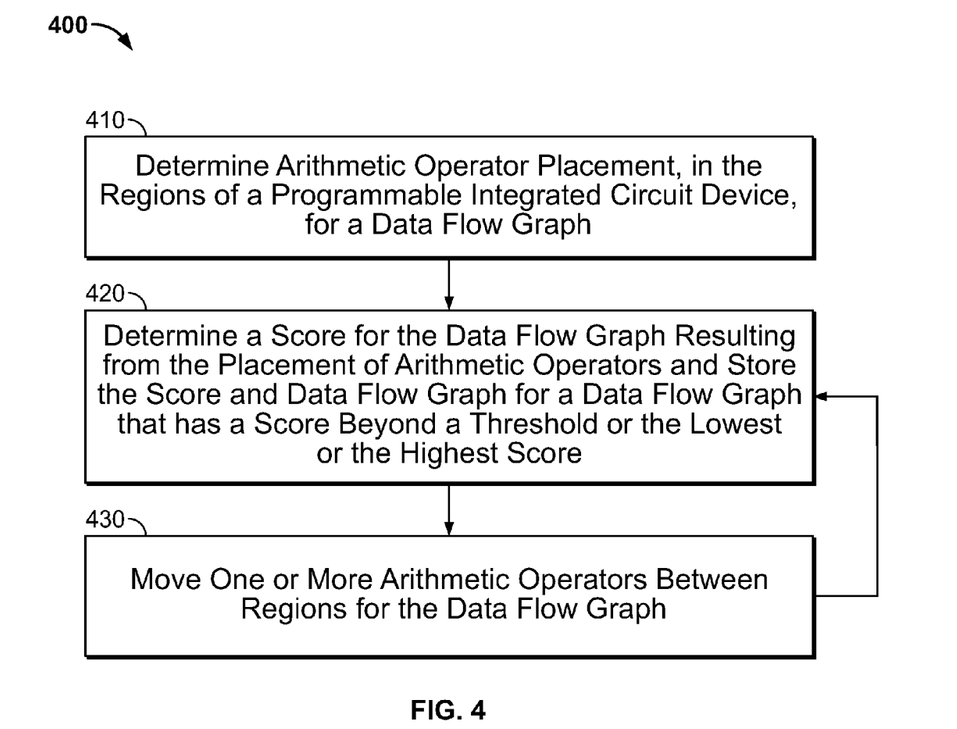
FIG. 4 shows an illustrative flow diagram illustrating a determination of which arithmetic operators are implemented in DSP blocks and which arithmetic operators are implemented in logic fabric on a programmable integrated circuit device, such as a programmable logic device (PLD) according to some embodiments.

FIG. 4 shows illustrative flow diagram 400 illustrating a determination of which arithmetic operators are implemented in DSP blocks and which arithmetic operators are implemented in logic fabric on a programmable integrated circuit device, such as a programmable logic device (PLD) according to some embodiments. Flow diagram 400 includes 410, 420, and 430. The elements of flow diagram 400 may be performed by, for example, the compiler of a high level language, as described above.

At 410, for a given data flow graph, it may be determined which arithmetic operators get placed in the regions of specialized processing blocks (e.g., DSP blocks) and which arithmetic operators that get placed in the regions of the logic fabric on the programmable integrated circuit device. In some embodiments, the determination of the placement of the arithmetic operators may be made randomly (e.g., random placement of the arithmetic operators in each region). In some embodiments, the determination of the placement of the arithmetic operators may be made using a specified technique, algorithm, or heuristic. In some embodiments, the initial placement of the arithmetic operators may be pre-defined. For example, at 410 the number of arithmetic operators of the data flow graph that get placed in the regions of specialized processing blocks (e.g., DSP blocks) and the number of arithmetic operators of the data flow graph that get placed in the regions of logic fabric may each be randomly determined. For example, at 410, the location of the arithmetic operators of the data flow graph may be randomly determined to be either in the regions of specialized processing blocks or in the regions of logic fabric. Any number of arithmetic operators may also be placed in other regions of the programmable integrated circuit device without departing from the scope and spirit of the present disclosure.

In some embodiments, elements of the data flow graph that consume larger areas in placement may be placed first, and then the placement of some or all of the arithmetic operators, e.g., in the regions of specialized processing blocks, or in the regions of logic fabric may each be determined. For example, elements such as large area consuming adders or arithmetic operators (e.g., large adders or hard-coded arithmetic operators) may be placed on the data flow graph of the programmable integrated circuit device first, and the type of other arithmetic operators (those that will be based in the logic fabric region or those that will be based in the region of specialized processing blocks) may then be determined. 420 may follow 410.

A given full placement of arithmetic operators that may initially be based on placement at 410 and may then subsequently be based on each iteration of the data flow graph may be provided to 420. The resulting data flow graph provided to 420 may be scored in terms of one or more metrics. For example, the data flow graph resulting from the initial placement of arithmetic operators at 410 and the subsequent iterations of the data flow graph, may have a score associated with the routing delays of paths, the area consumed by the graph on the device, and/or the latency of computations within the data flow graph. As another example, the data flow graph resulting from the initial placement of arithmetic operators at 410 and the subsequent iterations of the data flow graph, may have a score associated with the area consumed by the data flow graph. Such types of one or more scores may be determined at 420. In some embodiments, a lower (or higher) score may indicate a better performance for the data flow graph. As different data flow graphs are scored, the data flow graph associated with the lowest (or highest) score may be stored for later use. In some embodiments, a data flow graph associated with a score that is below a threshold value (or above a threshold value) value may be stored for later use and placement. 430 may follow 420.

At 430, the placement of one or more of the arithmetic operators of the data flow graph (e.g., number of arithmetic operators in each region of the programmable integrated circuit device and their locations) may be changed. For example, an arithmetic operator that was located in a region of specialized processing blocks (e.g., DSP blocks) on the programmable integrated circuit device may be moved to a region of logic fabric on the device. As another example, an arithmetic operator that was located in a region of logic fabric on the programmable integrated circuit device may be moved to a region of specialized processing blocks (e.g., DSP blocks) on the device. 420 may follow 430. 420 and 430 may be repeated until a data flow graph that has the best (lowest or highest) overall score is determined and/or stored for use.

It should be understood that one or more elements (such as elements 410, 420, and 420) shown in flow diagram 400 may be combined with other elements, performed in any suitable order, performed in parallel (e.g., simultaneously or substantially simultaneously), or removed. For example, elements 420 and 430 of flow diagram 400 may be performed simultaneously, or in a different order than shown in FIG. 4. Process 400 may be implemented using any suitable combination of hardware and/or software in any suitable fashion. For example, flow diagram 400 may be implemented using instructions encoded on a non-transitory machine readable storage medium.

Figure 5:
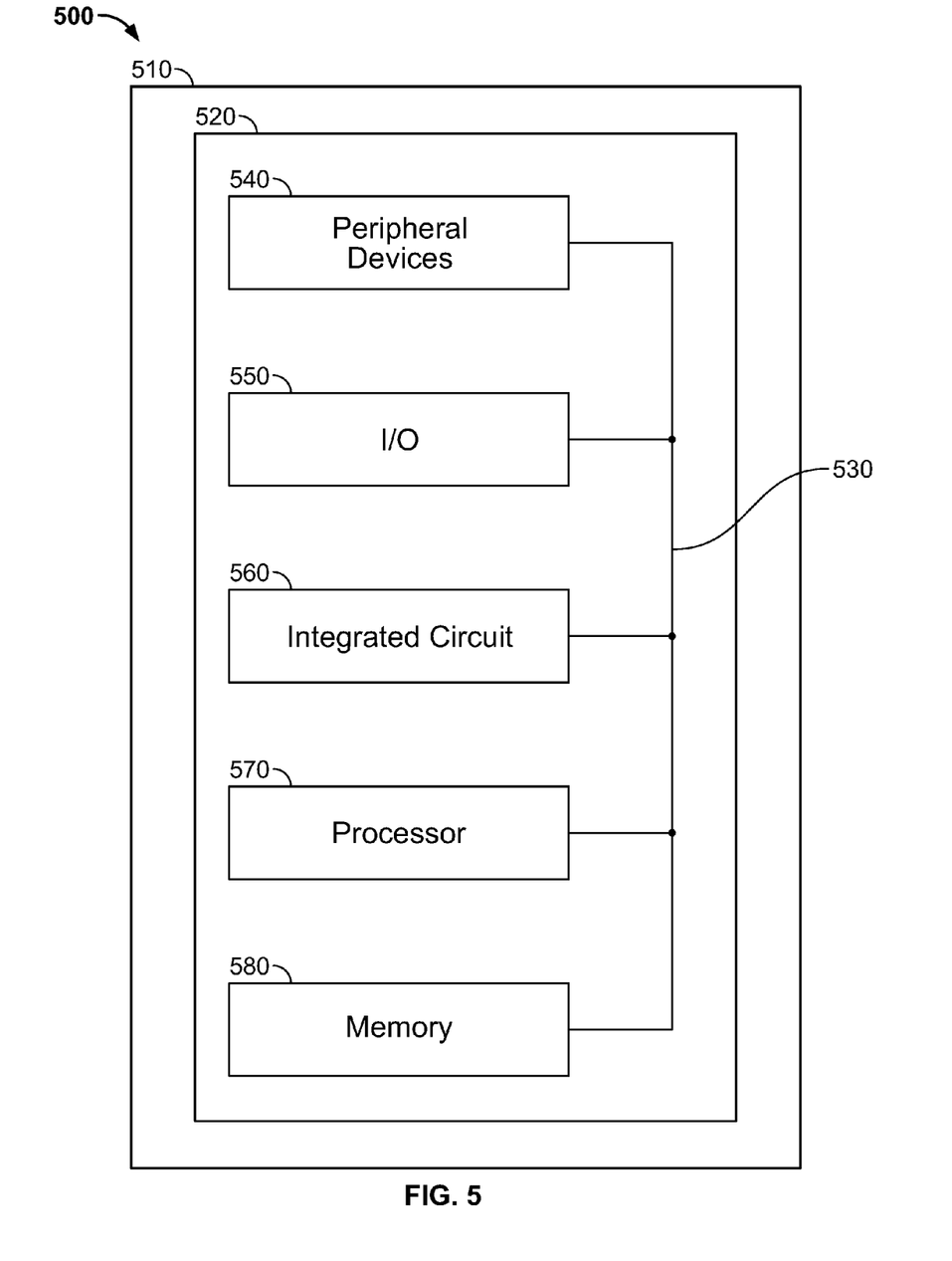
FIG. 5 is a simplified block diagram of an illustrative system employing an integrated circuit device incorporating aspects of the present invention.

FIG. 5 illustrates a circuit or other device 560 that includes embodiments of a basic block module (e.g., of MACs), implemented using a data flow graph, which make use of arithmetic operators based both in DSP blocks and in logic fabric as described herein as being within a data processing system 500. In an embodiment, integrated circuit or device 560 may be an integrated circuit, application specific standard product (ASSP), application specific integrated circuit (ASIC), programmable logic device (PLD), full-custom chip, or dedicated chip). In some embodiments, element 560 may be substantially similar to what is shown by PLD 300 of FIG. 3. Data processing system 500 may include one or more of the following components: circuit 560, processor 570, memory 580, I/O circuitry 550, and peripheral devices 540. These components are connected together by a system bus or other interconnections 530 and are populated on a circuit board 520 which is contained in an end-user system 510.

System 500 could be used in a wide variety of applications, such as computer networking, data networking, instrumentation, video processing, digital signal processing, or any other application where the advantage of using programmable or reprogrammable logic is desirable. Circuit 560 may be used to perform a variety of different logic functions. For example, circuit 560 may be configured as a processor or controller that works in cooperation with processor 570. Circuit 560 may also be used as an arbiter for arbitrating access to a shared resource in system 500. In yet another example, circuit 560 can be configured as an interface between processor 570 and one of the other components in system 500. It should be noted that system 500 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A method of placing arithmetic operators on a programmable integrated circuit device including a plurality of regions, said method comprising:
   determining, using a data processing system including a host interface and a memory interface, a placement of a first plurality of arithmetic operators of a data flow graph of multiply accumulate units (MACs) in a region of digital signal processing (DSP) circuitry of the programmable integrated circuit device and a second plurality of arithmetic operators of the data flow graph in a region of logic fabric of the programmable integrated circuit device, wherein the data flow graph of MACs includes four stages of arithmetic operators, wherein each arithmetic operator in the four stages is based in one of the region of DSP circuitry and the region of logic fabric; and
   determining, using the data processing system, a score related to the performance of the data flow graph.

2. The method of claim 1, wherein the score is related to routing delays in the data flow graph or related to data flow graph area.

3. The method of claim 1, wherein the score is lower for lower routing delays in the data flow graph and higher for higher routing delays in the data flow graph.

4. The method of claim 1, further comprising:
   moving, using the data processing system, one of the first plurality of arithmetic operators and the second plurality of arithmetic operators of the data flow graph, and
   determining, using the data processing system, a score related to the performance of the data flow graph.

5. The method of claim 4, further comprising:
   storing, using the data processing system, a placement of the first plurality of arithmetic operators and the second plurality of arithmetic operators of the data flow graph that corresponds to a best value of the score related to the performance of the data flow graph.

6. A programmable integrated circuit device configured according to the method of claim 1.

7. The method of claim 1, wherein the determining the placement comprises randomly determining the placement of one of the first plurality of arithmetic operators and the second plurality of arithmetic operators of the data flow graph in one of the plurality of regions of the programmable integrated circuit device.

8. A non-transitory machine readable storage medium encoded with instructions for performing a method of placing arithmetic operators on a programmable integrated circuit device including a plurality of regions, said instructions comprising:
   instructions to determine, using a data processing system including a host interface and a memory interface a placement of a first plurality of arithmetic operators of a data flow graph of a basic block module of multiply accumulate units (MACs) in a region of digital signal processing (DSP) circuitry of the programmable integrated circuit device and a second plurality of arithmetic operators of the data flow graph in a region of logic fabric of the programmable integrated circuit device, wherein the data flow graph of MACs includes four stages of arithmetic operators, wherein each arithmetic operator in the four stages is based in one of the region of DSP circuitry and the region of logic fabric; and
   instructions to determine, using the data processing system a score related to the performance of the data flow graph.

9. The non-transitory machine readable storage medium of claim 8, wherein the score is related to routing delays in the data flow graph or related to data flow graph area.

10. The non-transitory machine readable storage medium of claim 8, wherein the score is lower for lower routing delays in the data flow graph and higher for higher routing delays in the data flow graph.

11. The non-transitory machine readable storage medium of claim 8, said instructions further comprising:
    instructions to move one of the first plurality of arithmetic operators and the second plurality of arithmetic operators of the data flow graph, and
    instructions to determine a score related to the performance of the data flow graph.

12. The non-transitory machine readable storage medium of claim 11, said instructions further comprising instructions to store a placement of the first plurality of arithmetic operators and the second plurality of arithmetic operators of the data flow graph that corresponds to a best value of the score related to the performance of the data flow graph.

13. The non-transitory machine readable storage medium of claim 8, wherein the instructions to determine the placement comprises instructions to randomly determine the placement of the first plurality of arithmetic operators and the second plurality of arithmetic operators of the data flow graph in one of the plurality of regions of the programmable integrated circuit device.

14. A programmable integrated circuit device including a plurality of regions comprising:
    a placement of a first plurality of arithmetic operators of a data flow graph of a basic block module of multiply accumulate units (MACs) in a region of digital signal processing (DSP) circuitry of the programmable integrated circuit device and a second plurality of arithmetic operators of the data flow graph in a region of logic fabric of the programmable integrated circuit device, wherein the data flow graph of MACs includes four stages of arithmetic operators, wherein each arithmetic operator in the four stages is based in one of the region of DSP circuitry and the region of logic fabric, and wherein the programmable integrated circuit device has a score related to the performance of the data flow graph.

15. The programmable integrated circuit device of claim 14, wherein the placement of the first plurality of arithmetic operators and the second plurality of arithmetic operators, associated with the data flow graph, corresponds to a best value of a score related to the performance of the data flow graph.

16. The programmable integrated circuit device of claim 14, wherein the placement of the first plurality of arithmetic operators and the second plurality of arithmetic operators is determined using a compiler of a high-level language.

* * * * *